(No Model.) 2 Sheets—Sheet 2.
A. B. MERRILL.
APPARATUS FOR RAISING WATER.
No. 403,124. Patented May 14, 1889.
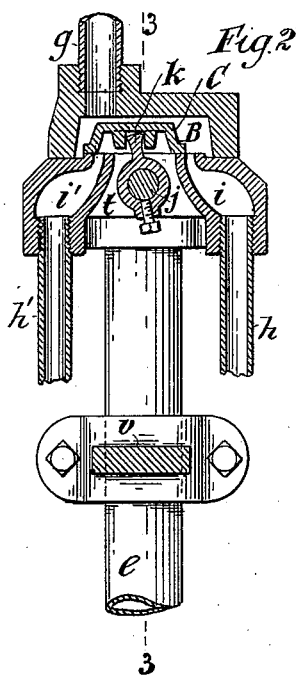
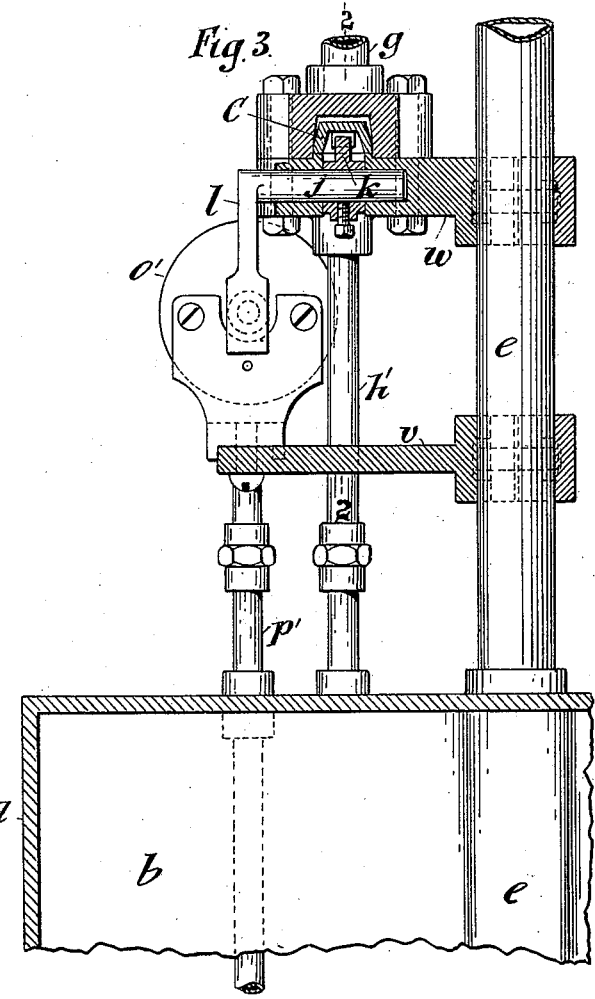
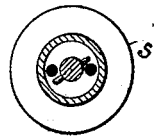
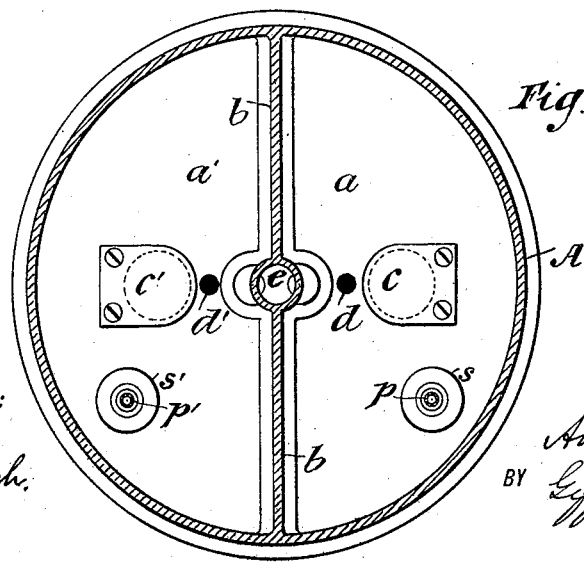
WITNESSES:
H. A. Raban
Maurice J. Roach
INVENTOR
Amos B. Merrell
BY Gifford & Brown
ATTORNEYS.

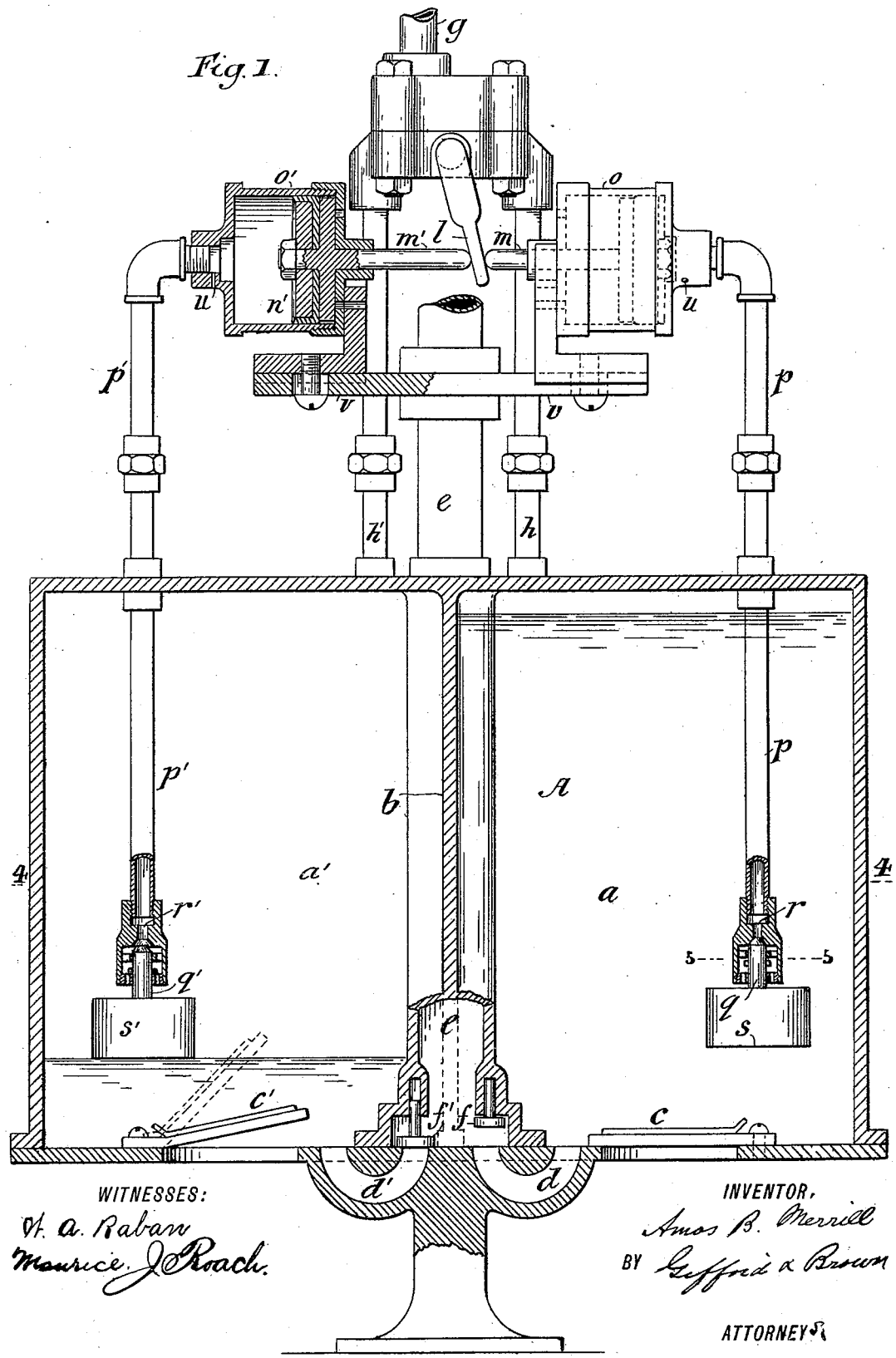

UNITED STATES PATENT OFFICE.

AMOS B. MERRILL, OF BOUND BROOK, NEW JERSEY, ASSIGNOR TO THE HARTFORD COMPRESSED AIR PUMP COMPANY, OF NEW JERSEY.

APPARATUS FOR RAISING WATER.

SPECIFICATION forming part of Letters Patent No. 403,124, dated May 14, 1889.

Application filed January 12, 1888. Serial No. 260,513. (No model.)

*To all whom it may concern:*

Be it known that I, AMOS B. MERRILL, of Bound Brook, New Jersey, have invented a new and Improved Apparatus for Raising Water, of which the following is a specification.

My invention relates particularly to that class of water-raising apparatus in which compressed air is used as the motive power for forcing the water, one of which apparatus is shown in Letters Patent of the United States No. 183,742, dated October 31, 1876, to J. A. Ayers. One of the difficulties with such an apparatus as that shown in said patent, which I propose to remedy, lay in the fact that the higher the column of water raised the greater the pressure on the valve, and consequently the greater the force required for moving it, while the power for moving it remained substantially constant. Thus the height of water-column raised was limited.

By means of my invention I propose that the power for moving the valve shall be increased as required, so that the power to move the valve may be commensurate with the pressure exerted upon it, due to the height to which the water is raised. For this purpose, when the compressed air has forced the water partially or entirely out of one of the compartments, I conduct it to mechanism whereby its pressure is brought to bear for moving the valve. Thus by increasing the air-pressure not only is the force upon the water increased, but also the force for moving the valve.

The mechanism in which I propose to embody my invention may be described as follows, having reference to the accompanying drawings.

Figure 1 is a vertical sectional elevation of the apparatus. Fig. 2 is a longitudinal section through the valve and its immediate surroundings, as through the line 2 2 of Fig. 3. Fig. 3 is a transverse section through the valve and some of the adjacent parts, as through the line 3 3 of Fig. 2. Fig. 4 is a sectional plan view through the line 4 4 of Fig. 1 on a reduced scale. Fig. 5 is a cross-section of pipe $p$ and valve $q$ through the line 5 5 of Fig. 1.

A is the chamber, within which the pressure of the air is brought to bear on the water, the air acting as a piston to drive the water. This chamber may be made of two separate vessels; but in the drawings I have shown it as a single vessel divided into two compartments, $a\ a'$, by a partition, $b$. The relative position of these compartments may be varied. The chamber may be made of any material. In the bottom of each compartment is a valve, $c\ c'$, for the entrance of the water. An exit water-way is provided in each compartment, as $d\ d'$, which, in the construction shown, both communicate with a central pipe, $e$, through which the column of water is forced. In the construction shown this pipe extends centrally up through the bucket A, and may serve as a support upon which to fasten the valve. In each of the water-ways $d\ d'$ is a check-valve, $f f'$, by which the water, after having once entered the pipe $e$, is prevented from flowing back into either compartment of the chamber. The air which is to act as a piston, having been compressed by any suitable means—as, for instance, a windmill—is brought to the apparatus through a pipe, $g$. It is delivered by said pipe $g$ into the chamber B, which surrounds a valve C. In the construction shown this is an ordinary sliding D-valve; but I do not limit myself to any particular kind of valve.

$h$ and $h'$ are the air-pipes by which the compressed air is conducted from the valve-chamber to the compartments of the bucket. The valve-chamber communicates with the pipe $h$ by the passage $i$, and with the pipe $h'$ by the passage $i'$. These passages are alternately closed and opened as the valve is at one end or the other of its stroke.

$j$ is a short oscillating shaft with suitable bearings running transversely of the valve in the arrangement shown. Upon this shaft is mounted an arm, $k$, which oscillates with the shaft, and is so connected with the valve as to cause it to slide from one end of its stroke to the other as the shaft oscillates.

$l$ is an arm secured also to the shaft $j$. This is the arm by which the shaft is oscillated, and to that end on each side of the free end of the arm $l$ is arranged a sliding pin, $m$ and $m'$, so that by the alternate thrusts of these pins the arm $l$ will be oscillated, and consequently the valve reciprocated. The pin $m'$ is connected with a piston, $n'$, operated in the cylinder $o'$. The pin $m$ is connected with a similar piston operated in the cylinder $o$. The pistons within the cylinders $o$ and $o'$ are respectively and alternately forced toward the arm $l$ by means of compressed air supplied through the pipes $p$ and $p'$ as follows, a description for one answering for both, since they are alike and work alternately. The pipe $p'$ communicates with the compartment $a'$ at a point below the high-water level in the compartment, as shown in the drawings, where it extends down well toward the bottom of the chamber. The extremity of the pipe is provided with a valve of any suitable construction opening outward into the compartment. In the drawings it is shown as a check-valve, $q'$, closing the entrance $r$ into the pipe.

$s'$ is a float which is connected with the valve, and so long as the float is buoyed up by the water in the compartment it will hold the valve to its seat and close the entrance to the pipe $p'$; but as soon as the float is relieved of the buoyancy of the water it will drop sufficiently to open the valve. By lengthening the stem connecting the float and the valve of course the end of the pipe may be placed at any convenient height in the chamber.

The operation of the apparatus is as follows: The chamber is immersed in a body of water, the valve and valve-gear being preferably located sufficiently above the chamber to be above the surface of the water. The water will rise up into the compartments, forcing the air contained in one compartment into pipe $g$, through the valve-chamber, and the air in the other compartment into the open air through the chamber $i$, beneath the D-valve. Suppose, now, the D-valve to be at the end of its stroke which connects pipe $g$ with pipe $h$, compressed air, being admitted through the pipe $g$, will find its way through pipe $h$ into compartment $a$. This compartment being full of water, its contents will be forced before the air into pipe $e$ until its level has fallen, so as to release its buoyancy on float $s$ and open valve $q$.

The opening of valve $q$ permits the compressed air to enter pipe $p$ and press upon piston $n$, so as to shove pin $m$ forward and slide the D-valve back again to the opposite end of its stroke, thus cutting the compressed air off from pipe $h$ and communicating that pipe with the open air and allowing the compressed air to enter compartment $a'$. Thereupon a similar operation is effected in compartment $a'$ to that already described in connection with compartment $a$.

A very fine hole may be drilled at the entrance to cylinders $o$ and $o'$, as at $u$, which must be so small as to not interfere with the driving of the piston by the compressed air. They will be relatively very much smaller than the passages in pipes $p$ or $p'$, being, in fact, nothing more than pin-points. These holes, however, will allow the air behind the piston to escape as it is moved back by force of the opposite piston.

For convenience and economy of construction I prefer to extend the pipe $e$ directly upward and secure to it the brackets $v$ and $w$, upon which are supported the valve C and its operating mechanism.

By repeating the operations above described first on one side of the valve and then on the other the compartments $a$ and $a'$ are alternately emptied into pipe $e$, the valve being shifted each time by means of the compressed-air pressure.

By continuing the pipes $p$ and $p'$ well down toward the bottoms of their respective compartments the water, being around the outside of the pipe, will prevent the compressed air from the pipes $h$ and $h'$ from gaining access around the valves $q$ $q'$ until the water has been forced down below the level of the end of the pipe, when it will be almost time for the air to be permitted to escape through the pipe $p$ or $p'$, as the case may be. It will be noticed that the seats for the valves $q$ and $q'$ are arranged somewhat above the lower ends of the pipes, leaving a bell-shaped projection of the pipe below the valve-seat. As the water rises in the compartment, a body of air will be entrapped within this bell-shaped projection, which will prevent the water rising up around the valve-seat. This body of air will thus keep the valve-seat clear of any dirt or sand which might otherwise be deposited there by the water.

In the drawings it will be observed that in compartment $a$ the level of the water is shown where it would be just after the compressed air from pipe $h$ is commencing to force it into the pipe $e$, the valve $q$ being closed. In compartment $a'$ the level of the water is where the float $s'$ has allowed the valve $q'$ to open and the water from outside has opened valve $c'$ to fill the compartment.

If the D-valve were so constructed that when in the center it would exactly cover both the outlets $i$ and $i'$, the apparatus might not start satisfactorily. To obviate any difficulty of this kind, I construct the D-valve of such length that the smallest practicable opening will be left into each outlet when the valve is centered. Then I also construct the apparatus so that one of the floats $s$ or $s'$ will operate to open its valve $q$ or $q'$ when the water in its compartment is at a slightly-higher level than the level at which the other float opens its valve. Thus if the pump is started with the D-valve centered the compressed air will at first enter both compartments and force the water out of both equally; but as soon as the quickest-operating float opens its valve the D-valve will be forced to one end of its stroke, and from that point the operations will be regular, as before described.

Having thus described an apparatus in which my invention may be usefully embodied, I do not limit myself to the particular mechanism described, as I am well aware that it may be varied indefinitely in form and number and relation of parts without departing from my invention.

I claim—

1. In an apparatus for raising water by means of compressed air or gas, the combination, with two compartments adapted to contain water and each provided with an exit-passage for the water, of a valve controlling the direction of the air or gas into one compartment or the other, and an exit-passage for the compressed air or gas from each compartment, each of said exit-passages being closed by a valve connected with a float, and one of said floats being arranged to operate its valve for a higher level of water than the other, substantially as described.

2. In an apparatus for raising water by means of compressed air or gas, the combination, with two compartments adapted to contain water and each provided with an exit-passage for the water, of a valve controlling the direction of the air or gas into one compartment or the other, the ports connecting the valve-chamber with the passages to the respective compartments being arranged so that when the valve is centered each port will be slightly open, whereby the water will be forced out of both the compartments, substantially as described.

3. In an apparatus for raising water by means of compressed air or gas, the combination, with two compartments adapted to contain water and each provided with an exit-passage for the water, of a valve controlling the direction of the air or gas into one compartment or the other, return-passages whereby the air is returned from said compartments to operate said valve, a valve controlling each of said return-passages, a float located in each compartment, connecting mechanism between each float and one of said last-mentioned valves, whereby, when the compartment within which the float is located is free from water, the said float will be suspended from said valve and hold the same open by its weight, said floats being each adapted to be raised by the buoyancy of the water to permit its valve to close, substantially as described.

4. In an apparatus for raising water by means of compressed air or gas, the combination, with two compartments adapted to contain water and each provided with an exit-passage for the water, of a valve controlling the direction of the air or gas into one compartment or the other, and return-passages whereby the compressed air or gas is returned from each compartment to operate the valve, said return-passages connecting with their respective compartments below the level of the water therein, whereby the water within the compartments acts as a packing to assist in preventing the escape of the air into the return-passage until the level of the water within the compartment has fallen, substantially as described.

5. In an apparatus for raising water by means of compressed air or gas, the combination, with two compartments adapted to contain water and each provided with an exit-passage for the water, of a slide-valve controlling the direction of the air or gas into one compartment or the other, return-passages whereby the compressed air is returned from each compartment to operate the valve, and a cylinder and piston actuated by the compressed air returned from each compartment, the pistons being connected with the exhaust side of said slide-valve, substantially as described, whereby the connections for moving the slide-valve from the returned compressed air do not enter the pressure-chamber of the slide-valve.

6. In an apparatus for raising water by means of compressed air or gas, the combination, with two compartments adapted to contain water and each provided with an exit-passage for the water, of a valve controlling the direction of the air or gas into one compartment or the other, and the pipes $p$ and $p'$, extending down toward the bottom of the respective compartments and each provided with a valve, substantially as described.

7. In an apparatus for raising water by means of compressed air or gas, the combination, with two compartments adapted to contain water and each provided with an exit-passage for the water, of a valve controlling the direction of the air or gas into one compartment or the other, and the pipes $p$ and $p'$, each provided with a valve having its seat located within the pipe at a distance back from the end thereof, whereby the air entrapped in the end of the pipe will prevent the entrance of same into the valve-seat, substantially as described.

8. In combination, the passage $g$, whereby the air is conducted to the valve, the reciprocating slide-valve, the passages $h$ and $h'$, into which the air is alternately directed by the valve, the cylinders $o$ and $o'$ and their respective pistons, and the lever $l$, whereby the power of the compressed air or gas is applied to the movement of the slide-valve, substantially as described.

9. In an apparatus for raising water by means of compressed air or gas, the combination, with two compartments adapted to contain water and each provided with an exit-passage for the water, of a valve controlling the direction of the air or gas into one compartment or the other, return-passages whereby the compressed air is returned from each compartment to operate the valve, and a cylinder and piston operated by the compressed air returned from each compartment, the said pistons being connected with the
5 valve to move the same, and the said cylinders being each provided with an exhaust-passage, $u$, of relatively small area to the area of the return-passage, substantially as described.

AMOS B. MERRILL.

Witnesses:
D. H. DRISCOLL,
W. A. RABAU.